United States Patent
Halfar et al.

(10) Patent No.: US 10,501,656 B2
(45) Date of Patent: Dec. 10, 2019

(54) SOLVENT-FREE WIRE ENAMEL COMPOSITION

(75) Inventors: Ronnie Halfar, Hamburg (DE); Sascha Toedter-Koenig, Hamburg (DE); Klaus-W. Lienert, Hamburg (DE); Simon Rost, Buechen (DE); Stefan Hartkopp, Hamburg (DE); Hans-Ulrich Moritz, Bendestorf (DE)

(73) Assignee: ELANTAS GmbH, Wesel (DE)

( * ) Notice: Subject to any disclaimer, the term of this patent is extended or adjusted under 35 U.S.C. 154(b) by 686 days.

(21) Appl. No.: 14/237,499

(22) PCT Filed: Aug. 6, 2012

(86) PCT No.: PCT/EP2012/065363
§ 371 (c)(1),
(2), (4) Date: Feb. 6, 2014

(87) PCT Pub. No.: WO2013/020953
PCT Pub. Date: Feb. 14, 2013

(65) Prior Publication Data
US 2014/0205758 A1    Jul. 24, 2014

(30) Foreign Application Priority Data
Aug. 9, 2011 (DE) .......... 10 2011 052 518

(51) Int. Cl.
*C09D 179/08* (2006.01)
*C08G 73/16* (2006.01)
*H01B 13/06* (2006.01)
*H01B 13/14* (2006.01)
*H01B 3/30* (2006.01)

(52) U.S. Cl.
CPC ......... *C09D 179/085* (2013.01); *C08G 73/16* (2013.01); *C09D 179/08* (2013.01); *H01B 3/306* (2013.01); *H01B 13/065* (2013.01); *H01B 13/148* (2013.01); *H01B 3/308* (2013.01)

(58) Field of Classification Search
CPC .......... C09D 179/08; C09D 179/085
USPC ..................... 427/388.2
See application file for complete search history.

(56) References Cited

U.S. PATENT DOCUMENTS

| | | | | |
|---|---|---|---|---|
| 3,877,909 A * | 4/1975 | Hansen | ........... | B01D 46/10 55/487 |
| 4,075,179 A * | 2/1978 | Karkoski | ........... | C08G 73/16 428/375 |
| 4,081,427 A | 3/1978 | Lange | | |
| 4,145,474 A | 3/1979 | Kertscher et al. | | |
| 4,379,916 A * | 4/1983 | Flowers | ........... | C08G 18/4063 428/379 |
| 4,406,851 A | 9/1983 | Janssen et al. | | |
| 4,731,398 A * | 3/1988 | Huber | ........... | C09D 167/00 523/500 |
| 6,075,179 A | 6/2000 | McCormack et al. | | |
| 2008/0128154 A1* | 6/2008 | Faust | ........... | H01B 3/30 174/120 R |
| 2008/0236864 A1 | 10/2008 | Haralur | | |
| 2010/0230158 A1* | 9/2010 | Hase | ........... | C08F 8/10 174/72 A |
| 2014/0066557 A1* | 3/2014 | Koso | ........... | C09J 133/14 524/166 |

FOREIGN PATENT DOCUMENTS

| | | | | |
|---|---|---|---|---|
| CA | 1141124 A | 2/1983 | | |
| CA | 1161616 A | 2/1984 | | |
| CA | 2237765 A | 5/1997 | | |
| CN | 101514276 A | 8/2009 | | |
| CN | 101641395 A | 2/2010 | | |
| CN | 101783214 A | 7/2010 | | |
| DE | 1495100 A1 | 7/1969 | | |
| DE | 1445263 A1 | 4/1970 | | |
| DE | 2911269 A1 | 10/1980 | | |
| DE | 19542564 A1 | 5/1997 | | |
| DE | 19600150 A1 | 7/1997 | | |
| EP | 0017062 A1 | 10/1980 | | |
| EP | 0024674 A1 | 3/1981 | | |
| EP | 0030717 A1 | 6/1981 | | |
| JP | S49-47884 A | 5/1974 | | |
| JP | S51-96071 A | 8/1976 | | |
| JP | S58-13657 A | 1/1983 | | |
| JP | 1989-189522 | * | 5/1989 | ........... C08F 299/04 |
| JP | 01129015 | * | 5/1989 | ........... C08F 299/04 |
| WO | 9107469 A1 | 5/1991 | | |
| WO | 2009024875 A2 | 2/2009 | | |

OTHER PUBLICATIONS

Derwent1989-189522_JP01129015A_Abstract, 1989. (Year: 1989).*
JP01129015A_Abstract_English_Translation (Year: 2018).*
JP01129015A_English_Translation (Year: 2018).*
L. Wells and H. Strunk, 1993, Proc. Electrical Electronics Insulation Conference, pp. 173-176.

* cited by examiner

*Primary Examiner* — Charles Capozzi
*Assistant Examiner* — Hai Y Zhang
(74) *Attorney, Agent, or Firm* — Abel Schillinger, LLP

(57) ABSTRACT

The present invention relates to a solvent-free wire enamel composition containing extrudable, polyesterimide-containing binders, prepared from polyols, polycarboxylic acids, imide-forming components, and structural elements which are crosslinkable after extrusion.

20 Claims, No Drawings

SOLVENT-FREE WIRE ENAMEL COMPOSITION

BACKGROUND OF THE INVENTION

1. Field of the Invention

The present invention relates to a new, solvent-free wire enamel composition and to its use.

2. Discussion of Background Information

Polyesterimide enamels are known from the prior art—for example, from DE-A 1445263, DE-A 1495100, and WO 91/07469 (PCT-EP 90/01911). Enamels of these kinds have good mechanical, thermal, and chemical properties. Consequently they have become widespread within the enameled wire industry.

The binders for polyesterimide-containing wire enamels consist of compounds of medium molecular mass, which are virtually insoluble in standard enamel solvents. As solvents for these wire enamels, therefore, cresolic solvents are used. These include phenols, isomers of cresol (monomethylated phenols), and xylenols, i.e., polymethylated phenols (in this regard, cf. L. Wells and H. Strunk, 1993, Proc. Electrical Electronics Insulation Conference, p. 172). The cresolic solvents are typically used together with extenders. Examples thereof that are contemplated include xylene, Solventnaphta$^R$, toluene, ethylbenzene, cumene, heavy benzene, and also various Solvesso$^R$ and Shellsol$^R$ products and also Deasol$^R$.

Application to the wire is accomplished by an enameling step and subsequent baking. In the course of this procedure, the resin crosslinks and becomes insoluble and infusible. According to the state of the art, this operation is repeated a number of times (10 to 20 times) until a pore-free film is obtained. The enameling rate is dependent on the wire diameter. The oven temperature is typically between 500 and 700° C. The wire temperature is not more than 300° C. During the enameling procedure, the copper wire is heated and cooled down again a number of times. From an energy standpoint, therefore, this method is costly and complex.

One alternative is to apply binders by an extrusion method. Materials contemplated for such a method include, primarily, thermoplastics. Such materials, however, do not meet the requirements imposed on modern wire enamels and enameled wires, since the heat resistance is typically only 120° C. For modern applications in coil construction and motor construction, however, resistances are required at temperatures of more than 155° C.

The extrusion coating of coiled wires and hence of wire enamels is known from the prior art. For instance, U.S. Pat. No. 4,145,474 describes the extrusion of polyethylene terephthalate. Extrusion coating of wires with polyethersulfone is also known, from DE 2911269 and EP 0017062. EP 0024674 describes the extrusion of polyethylene terephthalate comprising titanium dioxide as a filler. Lastly, EP 0030717 describes the production of a two-layer wire by extrusion.

The stated methods, however, involve pure coating with thermoplastic components. On account of the deficient heat resistance, they are not suitable for modern applications producing heat of more than 155° C. There are no references in any of these specifications to the problem of the deficient heat resistance.

It is now an object of the present invention to provide a solvent-free wire enamel composition which is applied in extrusion methods but nevertheless meets the requirements of the modern applications in coil construction and motor construction. The application is also to meet the requirements, in particular, in temperature ranges of more than 155° C. The resulting enameled wires are to meet the usual standards for coiled wires.

SUMMARY OF THE INVENTION

This object is achieved by means of solvent-free wire enamel compositions comprising extrudable, polyesterimide-containing binders, prepared from polyols, polycarboxylic acids, imide-forming components, and crosslinkable structural elements which are crosslinkable after extrusion.

Various alcohols are suitable for preparing the polyesterimides, more particularly diols and triols. Examples are ethylene glycol, 1,2- and 1,3-propylene glycol, 1,2-, 1,3-, and 1,4-butanediol, 1,5-pentanediol, neopentyl glycol, diethylene glycol, triethylene glycol, glycerol, trimethylolethane, trimethylolpropane, and tris-2-hydroxyethyl isocyanurate.

Particularly preferred in accordance with the invention is the use of diols. Employed more particularly in this context are ethylene glycol and diethylene glycol.

Suitable carboxylic acids for preparing polyesterimides are aromatic acids and their derivatives. Examples are phthalic acid, isophthalic acid, terephthalic acid, 2,6-naphthalenedicarboxylic acid, and their esterifiable derivatives. The esterifiable derivatives include, for example, anhydrides and the lower alkyl esters of the stated acids, e.g., methyl, ethyl, propyl, butyl, amyl, hexyl, and octyl esters. It is possible to employ the monoesters, the diacyl esters, and also the mixtures of these compounds. Likewise contemplated are acid halides. In accordance with the invention it is also possible to employ aliphatic dicarboxylic acids, examples being oxalic acid, malonic acid, succinic acid, glutaric acid, adipic acid, pimelic acid, azelaic acid, sebacic acid, maleic acid, fumaric acid, or sorbic acid, and also their esterifiable or transesterifiable derivatives. Particularly preferred in accordance with the invention is the use of terephthalic acid.

The imide-containing components used in accordance with the invention are responsible for the thermal properties. These components may be obtained, for example, by reactions between compounds of which one possesses five-membered, cyclic carboxylic anhydride moieties and at least one further functional group, while the other comprises at least one other functional group in addition to a primary amino group. These other functional groups are, in particular, carboxyl groups or hydroxyl groups. It is also possible, however, for further primary amino groups or carboxylic anhydride groups to be employed.

Examples of compounds having a cyclic carboxylic anhydride moiety and other functional groups are, in particular, pyromellitic dianhydride and trimellitic anhydride. Also contemplated, furthermore, are other aromatic carboxylic anhydrides, examples being the naphthalenetetracarboxylic anhydrides or the dianhydrides of tetracarboxylic acids having two benzene rings in the molecule, where the carboxyl groups are in 3,3',4- and 4'-position.

Examples of compounds having a primary amino group are, in particular, diprimary diamines. Examples are ethylenediamine, tetramethylenediamine, hexamethylenediamine, nonamethylenediamine, and other aliphatic diprimary diamines. Also contemplated are aromatic diprimary diamines, such as benzidine, diaminodiphenylmethane, diaminodiphenyl sulfone, sulfoxide, ether, and thioether, phenylenediamines, tolylenediamines, and also diamines having three benzene rings in the molecule, e.g., 1,4-bis(4-aminophenoxy)benzene.

Also contemplated in accordance with the invention are cycloaliphatic diamines, such as 4,4'-dicyclohexylmethanediamine.

As amino-containing compounds with another functional group it is also possible to use amino alcohols, examples being monoethanolamine, monopropanolamine, and aminocarboxylic acids, examples being glycine, aminopropanoic acid, aminocaproic acid, or aminobenzoic acid. Particularly preferred is the use of the reaction product of 2 mol of trimellitic anhydride with one mole of 4,4'-diaminodiphenylmethane.

The crosslinkable structural elements used in accordance with the invention may be incorporated in the main chain of the polymers or as end groups. From experience, unsaturated bonds are needed for crosslinking by UV and IR radiation. Structures incorporated catenarily consist of unsaturated carboxylic acids, which can be used in the binders of the invention. These are maleic acid, fumaric acid, tetrahydrophthalic acid, endomethylenetetrahydrophthalic acid, itaconic acid, their esters, anhydrides, or acyl chlorides.

Terminally incorporated crosslinkable groups are 3-methyl-1-buten-1-ol, allyl ethers, acrylic acid, methacrylic acid, dicyclopentene structures prepared by addition reaction of lower dicarboxylic acids, such as maleic or succinic acid, with dicyclopentadiene, and the reaction product of tetrahydrophthalic anhydride with primary amines which also have a second functional group, examples being ethanolamine, propanolamine, and butanolamine. Also suitable in accordance with the invention are various allyl ethers of polyols, examples being trimethylolpropane monoallyl and diallyl ether, as catenary or terminal crosslinkable moieties.

If electron beams are employed for the crosslinking, it is not absolutely necessary for unsaturated structural elements to be present.

The polyesterimide resins are prepared using the known transesterification catalysts, of which the skilled person is aware. These include heavy metal salts, organic titanates, cerium compounds and tin compounds, and also organic acids, e.g., p-toluenesulfonic acid.

Examples of heavy metal salts are lead acetate and zinc acetate. The titanates which can be used include, for example, tetra-N-butyl titanate, tetraisopropyl titanate, tetrapropyl titanate, tetrabutyl titanate, tetraamyl titanate, tetrahexyl titanate, tetraethyl titanate, tetramethyl titanate, diisopropyl dibutyl titanate, or amyl titanates, e.g., tetraphenyl titanate, tetracresyl titanate, tetrahexyl titanate, or else triethanolamine titanate.

For crosslinking with UV radiation, UV initiators matched to the emitter are added to the binders of the invention. Examples of such initiators are as follows: 1-hydroxycyclohexyl phenyl ketone, 2-hydroxy-2-methyl-1-phenyl-1-propanone, 2-hydroxy-1-[4-(2-hydroxy-ethoxyphenyl]-2-methyl-1-propanone, methyl benzoylformates.

For thermal crosslinking, peroxides are added. Examples are as follows: dicumyl peroxide, dibenzoyl peroxide, 2,5-dimethyl-2,5-di(tert-butylperoxy)hex-3-yne, di-tert-butyl peroxide, 2,5-dimethyl-2,5-di(tert-butylperoxy)hexane, tert-butyl cumyl peroxide, di(tert-butylperoxyisopropyl)benzene, butyl-4,4-di(tert-butylperoxy)valerate, 1,1-di(tert-butylperoxy), -3,3,5-trimethyleyelohexane, tert-butylperoxybenzoate, di(4-methylbenzoyl peroxide, di(2,4-dichlorobenzoyl) peroxide. Also suitable for use are C-C labile initiators, e.g., 1,1,2,2-tetraphenylethanediol (benzopinacol), benzopinacols substituted on the benzene rings, 1,2-di-tert-butylethanediol and its derivatives, 2,3-dimethyl-2,3-diphenylbutane, and poly-1,4-diisopropylbenzene.

A combination of thermal and radiation curing is possible by addition of thermal and radiation initiators.

The extrudable, polyesterimide-containing binders of the invention are preferably prepared from:

30-60 wt %, based on the resin mass, preferably 35-55 wt %, more preferably 40-50 wt % of catenary, imide-forming components, 2-20 wt %, preferably 5-15 wt %, more preferably 7-11 wt % of unsaturated carboxylic acids. The balance to 100 wt % consists of polyesterimide resin, comprising the customary building blocks. The quantity figures are in wt % based on the resin mass.

Thermal post-crosslinkability is achieved by admixing of 0.5-6 wt %, preferably 1-5 wt %, more preferably 1.5-4 wt % of peroxidic crosslinkers.

Photochemical post-crosslinkability is achieved by admixing of 0.3 to 6 wt %, preferably 0.6 to 5 wt %, more preferably 1 to 4 wt % of UV initiator.

The quantity figures for the admixed components are wt % based on the extrudable formulation.

The wire enamel composition of the invention may further comprise usual auxiliaries and additives. Preferred amounts are up to 1 wt %, based on the total weight of the components. Auxiliaries for the wire enamel composition may also include, for example, additives to enhance flow and to enhance adhesion.

In accordance with the invention the polyesterimide resins are typically prepared by reaction of the alcohol, carboxylic acid, and imide-forming components in a melt condensation. The reaction can be monitored using the distillate obtained, or the acid number or OH number.

After the condensation the resins are cooled, ground, and sieved. Thereafter the initiators necessary for crosslinking are added and homogenized.

The extrudable, polyesterimide-containing binders of the invention that have been prepared in this way may be applied to the wire enamel. For this purpose they are melted in an extruder. The coated wire is then passed through a curing zone. There, crosslinking is carried out by means of heat and/or radiation.

The wire to be coated is supplied typically at room temperature, but may also have been preheated, or else may be heated until red-hot. Typical take-off speeds are between 5 and 600 m/min, depending on the thickness of the wire to be coated.

DETAILED DESCRIPTION OF THE PRESENT INVENTION

Examples

Example 1

Resin 1

A three-neck flask with thermometer, stirrer, and reflux condenser is charged with 30.596 g of 1,2,3,6-tetrahydro-N-(2-hydroxyethyl)phthalimide, 0.017 g of methyl-hydroquinone, and 14.275 g of ethylene glycol, and this initial charge is heated to 130° C. At 130° C., 32.386 g of trimellitic anhydride are added and the mixture is heated to 190° C. As soon as 2.7 g of distillate have been obtained, the mixture is cooled to 130° C. Addition of 14.442 g of diaminodiphenylmethane is followed by heating to 150° C. and stirring for an hour, which is followed in turn by heating to 190° C. and stirring until a total of 5.9 g of distillate are obtained. The reaction mixture is then cooled to 150° C. and admixed with 8.251 g of maleic anhydride and 0.033 g of methylhydroquinone. This mixture is heated to 195° C. and stirred until a further 1.2 g of distillate is obtained. Stirring is subsequently continued under membrane pump vacuum until a further 2.4 g of distillate are obtained. The reaction product is discharged without further working-up.

Example 2

Resin 2

A three-neck flask with thermometer, stirrer, and reflux condenser is charged with 30.596 g of 1,2,3,6-tetrahydro-N-(2-hydroxyethyl)phthalimide, 0.017 g of methyl-hydroquinone, and 14.275 g of ethylene glycol, and this initial charge is heated to 130° C. At 130° C., 32.386 g of trimellitic anhydride are added and the mixture is heated to 190° C. As soon as 2.7 g of distillate have been obtained, the mixture is cooled to 130° C. Addition of 14.442 g of diaminodiphenylmethane is followed by heating to 150° C. and stirring for an hour, which is followed in turn by heating to 190° C. and stirring until a total of 5.9 g of distillate are obtained. The reaction mixture is then cooled to 150° C. and admixed with 7.373 g of maleic anhydride, 1.622 g of dimethyl terephthalate, and 0.033 g of methylhydroquinone. This mixture is heated to 195° C. and stirred until a further 1.3 g of distillate is obtained. Stirring is subsequently continued under membrane pump vacuum until a further 2.4 g of distillate are obtained. The reaction product is discharged without further working-up.

Example 3

Resin 3

A three-neck flask with thermometer, stirrer, and reflux condenser is charged with 6.303 g of 3-methyl-3-buten-1-ol, 7.178 g of maleic anhydride, 0.008 g of methylhydroquinone, and this initial charge is heated to 120° C. The highly exothermic reaction is cooled in a water bath. After the end of the reaction, the mixture is heated to 130° C. 20.600 g of ethylene glycol and 11.788 g of ethyl diglycol and 30.230 g of trimellitic anhydride are added. The reaction mixture is heated to 190° C. and stirred until 2.5 ml of distillate are obtained. It is cooled to 130° C. and 13.480 g of diaminodiphenylmethane are added. It is heated to 190° C. and stirred until a total of 8.1 g of distillate are obtained. It is cooled to 150° C. and 0.031 g of methylhydroquinone, 3.851 g of maleic anhydride 6.454 g of endomethylenetetrahydrophthalic acid, and 0.078 g of butyl titanate are added. The reaction mixture is heated to 190° C. and stirred until a further 1.2 g of distillate have been collected. Stirring is subsequently continued under membrane pump vacuum until a further 4.4 g of distillate have been produced. The reaction product is discharged without further working-up.

Example 4

Resin 4

A three-neck flask with thermometer, stirrer, and reflux condenser is charged with 2.575 g of water, 6.935 g of maleic anhydride, 0.008 g of methylhydroquinone, and this initial charge is heated to 100° C. and stirred for 30 minutes. It is then heated to 130° C. and 10.025 g of dicyclopentadiene are added dropwise. After the end of the additions, stirring is carried out at 130° C. for an hour. 11.390 g of ethyl diglycol, 15.369 g of diethylene glycol, and 29.209 g of trimellitic anhydride are added and the mixture is heated to 190° C. As soon as 3.3 g of aqueous distillate have been obtained, the mixture is cooled to 130° C. and 13.025 g of diaminodiphenylmethane are added. The mixture is heated to 190° C. and stirred until a total of 5.8 g of distillate have been obtained. It is cooled to 150° C. and 7.442 g of maleic anhydride, 0.030 g of methylhydroquinone, and 3.991 g of ethylene glycol are added. The reaction mixture is heated to 190° C. and stirred until a further 1.4 g of distillate have been obtained. Stirring is continued under a membrane pump vacuum until a further 2.57 g of distillate have been produced. The reaction product is discharged without further working-up.

Example 5

Extrusion Resin 1

A 30% strength solution of the resin from Example 1 in tetrahydrofuran (THF) is prepared. The solution is admixed with 2.5% of dicumyl peroxide (based on resin). The solution is used to coat 0.3 mm copper panels. The coated panels are dried at 90° C. for 30 minutes. The panels are subsequently cured at 250° C. for 15 minutes. This gives strong, smooth, and well-adhering enamel films with a thickness of 10 μm.

The breakdown voltage (IEC 60464) is 2.4 kV. The mandrel bending test (IEC 60464 Part 2) around a 1 mm mandrel is passed.

If the solvent is stripped off carefully in a vacuum, a solid resin is obtained which, after having been ground and sieved, was extruded in a modified extruder onto a 0.9 mm copper wire. The wire is post-crosslinked at 300° C. for 1 minute. A smooth, well-adhering enameled wire is obtained. Prior to crosslinking, the enamel film is detachable using N-methylpyrrolidone, but not thereafter.

Example 6

Extrusion Resin 2

A 30% strength solution of the resin from Example 2 in THF and admixed with 2.5% of dicumyl peroxide, based on resin, is prepared. The solution is used to coat 0.3 mm copper panels. The coated panels are dried at 90° C. for 30 minutes. The coating is then cured at 250° C. for 15 minutes. This gives strong, smooth, and well-adhering enamel films with a thickness of 10 μm.

The breakdown voltage (IEC 60464) is 2.6 kV. The mandrel bending test (IEC 60464 Part 2) around a 1 mm mandrel is passed.

If the solvent is stripped off carefully under reduced pressure, a solid resin is obtained which, after having been ground and sieved, was extruded in a modified extruder onto a 0.9 mm copper wire. The wire is post-crosslinked at 300° C. for 1 minute. A smooth, well-adhering enameled wire is obtained. Prior to crosslinking, the enamel film is detachable using N-methylpyrrolidone, but not thereafter.

Example 7

Extrusion Resin 3

A 30% strength solution of the resin from Example 3 in THF is prepared. The solution is admixed with 2.5% of dicumyl peroxide (based on resin). The solution is used to coat 0.3 mm copper panels. The coated panels are dried at 90° C. for 30 minutes. The coating is subsequently cured at 250° C. for 15 minutes. This gives strong, smooth, and well-adhering enamel films with a thickness of 10 μm.

The breakdown voltage (IEC 60464) is 2.4 kV. The mandrel bending test (IEC 60464 Part 2) around a 1 mm mandrel is passed.

If the solvent is stripped off carefully in a vacuum, a solid resin is obtained which, after having been ground and sieved, was extruded in a modified extruder onto a 0.9 mm copper wire. The wire was post-crosslinked at 300° C. for 1 minute. A smooth, well-adhering enameled wire was obtained. Prior to crosslinking, the enamel film is detachable using N-methylpyrrolidone, but not thereafter.

Example 8

Extrusion Resin 4

A 30% strength solution of the resin from Example 4 in THF is prepared. The solution is admixed with 2.5% of dicumyl peroxide (based on resin). The solution is used to coat 0.3 mm copper panels. The coated panels are dried at 90° C. for 30 minutes. The coating was subsequently cured at 250° C. for 15 minutes. This gives strong, smooth, and well-adhering enamel films with a thickness of 10 μm.

The breakdown voltage (IEC 60464) is 2.5 kV. The mandrel bending test (IEC 60464 Part 2) around a 1 mm mandrel is passed.

If the solvent is stripped off carefully in a vacuum, a solid resin is obtained which, after having been ground and sieved, was extruded in a modified extruder onto a 0.9 mm copper wire. The wire was post-crosslinked at 300° C. for 1 minute. A smooth, well-adhering enameled wire was obtained. Prior to crosslinking, the enamel film is detachable using N-methylpyrrolidone, but not thereafter.

Example 9

Extrusion Resin 5

A 30% strength solution of the resin from Example 4 in THF is prepared. The solution is admixed with 2% of benzyl dimethyl ketal (based on resin). The solution is used to coat 0.3 mm copper panels. The coated panels are dried at 90° C. for 30 minutes. Thereafter the panels are irradiated with 2400 mJ/cm$^2$ (i.e., 24 cm distance, 2.5 min) of UV light, using a Höhnle UV 400F/2 lamp, 380 W. This gives strong, smooth, and well-adhering enamel films with a thickness of 10 μm.

The breakdown voltage (IEC 60464) is 2.6 kV. The mandrel bending test (IEC 60464 Part 2) around a 1 mm mandrel is passed.

If the solvent is stripped off carefully in a vacuum, a solid resin is obtained which, after having been ground and sieved, was extruded in a modified extruder onto a 0.9 mm copper wire. Post-crosslinking with a Höhnle UV 400F/2, 380 emitter gave a smooth, well-adhering enamel film. Prior to crosslinking, the enamel film is detachable using N-methylpyrrolidone, but not thereafter.

Comparative Example 10

Comparative Example with PET

Standard commercial polyethylene terephthalate is cooled with liquid nitrogen and then ground, then admixed alternatively with 2.5% of dicumyl peroxide or 2% of dimethyl benzyl ketal and extruded in a modified extruder onto a 0.9 mm copper wire. Post-crosslinking is possible neither thermally nor photochemically. The glass transition remains at 70° C. There is therefore no crosslinking.

What is claimed is:

1. A method of applying an enamel composition to a wire, wherein the method comprises melting the enamel composition in an extruder, applying the melted composition to the wire and subjecting the applied composition to post-crosslinking, the enamel composition being a solvent-free wire enamel composition comprising an extrudable, polyesterimide-containing binder prepared from (i) polyols, (ii) polycarboxylic acids, (iii) imide-forming components, and (iv) structural elements which are crosslinkable after extrusion, and wherein components (iii) are catenary imide-forming components and structural elements (iv) are unsaturated carboxylic acids and the composition comprises 30-60 wt % of catenary imide-forming components and 2-20 wt % of unsaturated carboxylic acids.

2. The method of claim 1, wherein the binder comprises 35-55 wt % of catenary, imide-forming components and 5-15 wt % of unsaturated carboxylic acids.

3. The method of claim 1, wherein the binder comprises 40-50 wt % of catenary, imide-forming components and 7-11 wt % of unsaturated carboxylic acids.

4. The method of claim 1, wherein structural elements (iv) are designed such that thermal post-crosslinking is made possible and/or is achieved by incorporating peroxidic crosslinkers in the composition.

5. The method of claim 4, wherein 0.5-6 wt % of peroxidic crosslinkers is present.

6. The method of claim 1, wherein structural elements (iv) are designed such that photochemical post-crosslinking is made possible.

7. The method of claim 1, wherein the composition further comprises a peroxide.

8. A method of producing a coated wire, wherein the method comprises melting a wire enamel composition in an extruder, applying the melted composition to the wire and subjecting the applied composition to post-crosslinking, the enamel composition being a solvent-free wire enamel composition comprising an extrudable, polyesterimide-containing binder prepared from (i) polyols, (ii) polycarboxylic acids, (iii) imide-forming components, and (iv) structural elements which are crosslinkable after extrusion, and wherein components (iii) are catenary imide-forming components and structural elements (iv) are unsaturated carboxylic acids and the composition comprises 30-60 wt % of catenary imide-forming components and 2-20 wt % of unsaturated carboxylic acids.

9. The method of claim 8, wherein the binder comprises 35-55 wt % of catenary, imide-forming components and 5-15 wt % of unsaturated carboxylic acids.

10. The method of claim 8, wherein the binder comprises 40-50 wt % of catenary, imide-forming components and 7-11 wt % of unsaturated carboxylic acids.

11. The method of claim 8, wherein structural elements (iv) are designed such that thermal post-crosslinking is made possible and/or is achieved by incorporating peroxide crosslinkers in the binder.

12. The method of claim 11, wherein 0.5-6 wt % of peroxide crosslinkers is present.

13. The method of claim 11, wherein structural elements (iv) are incorporated in a main chain of corresponding polymers.

14. The method of claim 11, wherein structural elements (iv) are present as an end groups of corresponding polymers.

15. The method of claim 8, wherein structural elements (iv) are designed such that photochemical post-crosslinking is made possible.

16. The method of claim 1, wherein structural elements (iv) comprise one or more of maleic acid, fumaric acid, tetrahydrophthalic acid, endomethylenetetrahydro-phthalic acid, itaconic acid, esters, anhydrides, and acyl chlorides of these acids; acrylic acid, methacrylic acid, dicyclopentene structures prepared by addition reaction of maleic acid or succinic acid with dicyclopentadiene; reaction products of tetrahydrophthalic anhydride with ethanolamine, propanolamine, and butanolamine.

17. The method of claim 8, wherein structural elements (iv) comprise one or more of maleic acid, fumaric acid, tetrahydrophthalic acid, endomethylenetetrahydro-phthalic acid, itaconic acid, esters, anhydrides, and acyl chlorides of these acids; acrylic acid, methacrylic acid, dicyclopentene structures prepared by addition reaction of maleic acid or succinic acid with dicyclopentadiene; reaction products of tetrahydrophthalic anhydride with ethanolamine, propanolamine, and butanolamine.

18. The method of claim 8, wherein structural elements (iv) are incorporated in a main chain and/or are present as end groups of corresponding polymers.

19. The method of claim 8, wherein structural elements (iv) are incorporated in a main chain of corresponding polymers.

20. The method of claim 8, wherein structural elements (iv) are present as an end groups of corresponding polymers.

\* \* \* \* \*